Aug. 6, 1968   C. G. MALIN   3,395,414
PORTABLE SCRAPER DEVICE
Filed June 15, 1966
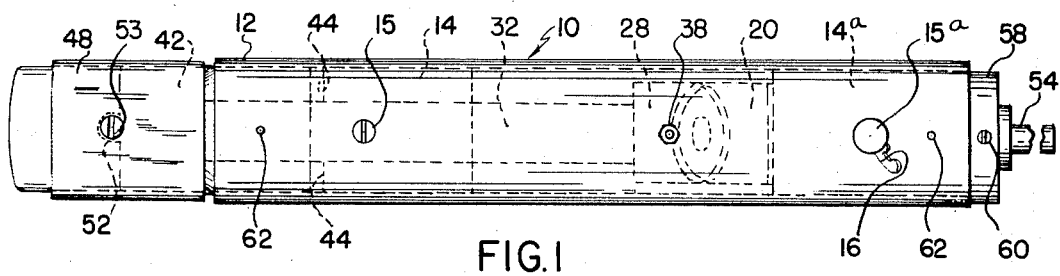
FIG.1
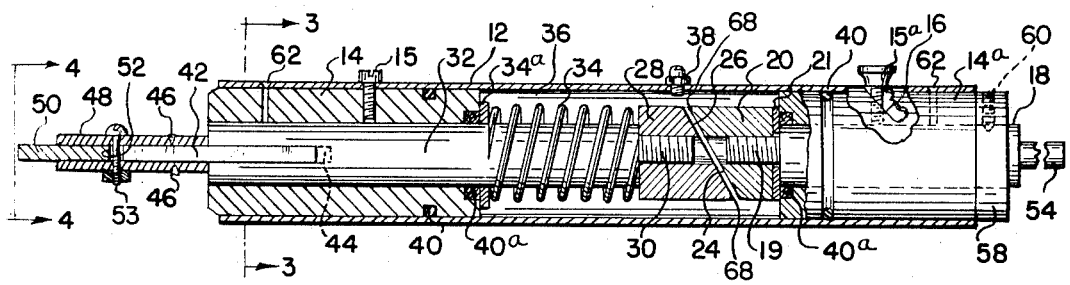
FIG.2
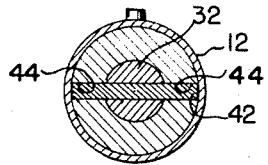
FIG.3
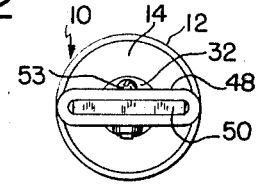
FIG.4
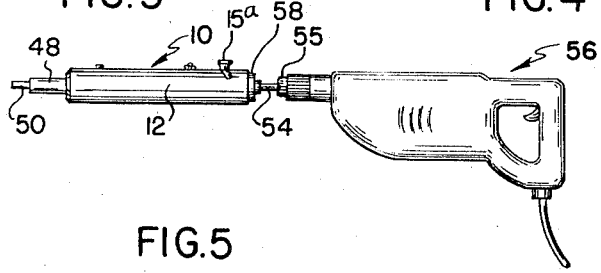
FIG.5
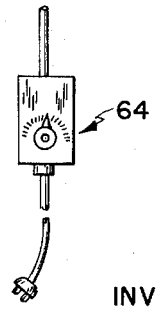
INVENTOR
CHARLES G. MALIN
BY
Baldwin, Doran & Egan
ATTORNEYS

United States Patent Office 3,395,414
Patented Aug. 6, 1968

3,395,414
PORTABLE SCRAPER DEVICE
Charles G. Malin, 22725 Cedar Point Road,
Cleveland, Ohio 44142
Filed June 15, 1966, Ser. No. 557,709
9 Claims. (Cl. 15—93)

ABSTRACT OF THE DISCLOSURE

A portable scraper mechanism for attachment to a portable tool such as an electric motor-driven drill, for scraping operations and comprising an elongated housing having a spring-loaded reciprocal plunger slidably mounted therein, with a scraper blade attached to the exterior end of the plunger and a cam attached to the inner end of the plunger. A rotatable cam is provided in confronting relation to the first-mentioned cam and, upon rotation thereof, coacts with the first-mentioned cam to cause reciprocal movement of the plunger. A diagonally extending slot and holding nut arrangement is provided for selectively varying the spacing between the cams and thus varying the amount of reciprocation of the plunger. A motor speed control can be used with the electrical drill to selectively vary the speed of reciprocation of the scraper element.

---

This invention relates in general to scraper mechanisms, and more particularly to a portable scraper mechanism which is adapted for ready attachment to a portable motor, such as a portable electric drill, for use in scraping operations.

Scraping operations are well known in the metal working industry wherein for instance, machine tool beds and the like are scraped to obtain a suitable surface for smooth relative movement between components of the machine tool. Such scraping operations often entail the production of decorative patterns of scrolls on the bed of the machine tool, in order that the appearance of the bed be decorative as well as suitable for providing relative movement between the parts of the machine tool.

Such scraping operations are often done manually by using a hand scraper, which entails considerable skill and effort on the part of the operator, in order to obtain a satisfactory and uniform surface on the article scraped. It is also known to utilize portable power scrapers for accomplishing the scraping operation, but heretofore such power scrapers have involved rather bulky and complex mechanisms which materially detract from the useability of the scraper and interfere with the proficiency of the operator.

The present invention provides a portable scraper mechanism of simplified, compact construction, and one which is adapted for ready attachment to a standard electric drill, and which is highly effective for use in scraping and other similar type operations.

Accordingly, an object of the invention is to provide a novel scraper device.

A further object of the invention is to provide a portable scraper device which may be readily attached to a standard electric drill for power operation of the scraper.

A still further object of the invention is to provide a novel scraper device which may be attached to a standard electric drill for power operation of the scraper, and which includes cam means for changing the rotary motion of the electric drill to a reciprocative motion, and wherein the scraper device is of simplified construction.

Another object of the invention is to provide a scraper mechanism of the latter mentioned type which includes means for adjusting the stroke of the scraper.

A still further object of the invention is to provide a scraper device which may be attached to a conventional electric drill for operation of the scraper, together with means for adjusting the speed of the drill and thus adjusting the speed of reciprocation of the scraper.

Other objects and advantages of the invention will be apparent from the following description taken in conjunction with the accompanying drawings wherein:

FIGURE 1 is a top plan view of the scraper device of the invention;

FIGURE 2 is a sectional elevational view of FIGURE 1;

FIGURE 3 is a sectional view taken generally along the plane of line 3—3 of FIGURE 2 looking in the direction of the arrows;

FIGURE 4 is an end elevational view of the scraper device taken generally along the plane of line 4—4 of FIGURE 2 looking in the direction of the arrows; and FIGURE 5 is a diagrammatic illustration of the scraper device as attached to a conventional electric drill, for operation of the scraping device, and with means coupled to the electric drill for selective control of the speed of rotation of the drill and thus control of the speed of reciprocation of the scraper mechanism.

Referring now again to the drawings, there is illustrated a scraper device 10 constructed in accordance with the invention, and comprising a hollow tubular-like body 12, which is initially open at both ends thereof. In each end of the body 10 there may be provided a bearing member 14, 14a, fitted into the respective end of the body. Each of such bearing members may be secured to the body by any suitable means, such as a fastening device 15 or 15a, extending through the wall of the body and into holding coaction with the respective bearing member. The opening in the body which receives the fastener 15a may be slotted as at 16 in a generally diagonal direction with respect to the lengthwise axis of the body, for a purpose to be hereinafter set forth.

Rotatably mounted in the bearing 14a may be a spindle shaft 18 having attached thereto as by means of threaded portion 19, a cam 20 so that the cam will rotate upon rotation of the shaft. Cam 20 may be of a greater diameter than the diameter of shaft 18 and is adapted for abutting relation with thrust washer 21 which in turn is adapted for engagement with the confronting end surface of the bearing 14a. Cam 20 has a diagonally extending cam face 24 which is adapted for camming coaction with complementary formed diagonally extending face 26 of cam 28 disposed in generally axial alignment with cam 20.

Cam 28 may be secured as by means of the threaded portion 30, to plunger 32 which is mounted for reciprocative movement in bearing 14. Cam 28 may be of a greater diameter than the diameter of plunger 32, and there is provided a spring means 34 coacting between the inner face of bearing 14 and the confronting face of cam 28, for returning the cam and the associated plunger inwardly after outward movement thereof with respect to body 12. Thrust washer 34a may be provided between spring 34 and bearing 14.

As can be seen in FIGURE 2, the bearing members 14, 14a define a chamber 36 interiorly of the housing 12, in which the cam structure and spring 34 are located. Such chamber may be provided with a grease fitting 38 for inserting lubricant into such chamber for lubricating the cams and the associated reciprocal movement of plunger 32. Bearing members 14, 14a may be provided with sealing means, such as O-rings 40 disposed in circumferential slots therein, for retaining the lubricant in the chamber, and fibrous washers 40a may be provided in recesses in bearings 14, 14a, for wiping coaction with the respective of plunger 32 and shaft 18.

The outer end of the plunger 32 may have a generally flattened lip or web 42 attached thereto by any suitable means, which lip extends laterally of the lateral extremities of the plunger member, and with such lip being received in sliding relation in slots 44 disposed in the bearing member 14, for preventing rotation of the plunger during reciprocative movement thereof. Abutting coaction between web 42 and the confronting ends of slots 44 limits the inward movement of plunger 32 as caused by spring 34. Secured as at 46 (e.g. spot welds) to the web 42 may be a scraper blade holder 48 of flattened tubular-like configuration which forms a housing for receiving the scraper blade 50 therein. The scraper blade may be of conventional well known type, comprising a generally flattened member of hardened material for scraping operations. The blade may have a slot 52 in the inner end thereof through which fastening means 53 may extend for tightening the grip of the holder member on the scraper blade. Holder member 48 may be somewhat deformable in the direction of extension of fastening means 53 for firmly gripping the scraper blade 50 upon tightening of the fastening means 53.

Spindle shaft 18 may be provided with an outwardly extending section 54 which is adapted for being received in the conventional chuck 55 of a conventional electric drill 56, for rotating the spindle shaft and thus causing rotation of cam 20 which in turn coacts with the cam 28 to cause outward movement of plunger 32 against the resistance to compression of the spring 34. As cam 20 completes 180° of its rotation and commences to return back to its starting position, the spring 34 causes retraction of the plunger. As aforementioned, the laterally extending means 42 engaging the confronting ends of slots 44 forming abutment means, limits the inward movement of the plunger. It will be seen that such reciprocative movement of the plunger will cause a uniform scraping action on a surface against which the scraper blade is held.

Collar 58 may be secured as by means of set screw 60 to shaft 18 and coacts with bearing 14a to prevent inward movement of the shaft with respect to the bearing. Oil holes 62 may be provided through body 12 and bearings 14, 14a, for receiving lubrication for the shaft 18 and the plunger 32.

The aforementioned slot 16 in body 12 preferably has positional recesses therein along one side thereof for enabling selective positioning of the bearing 14a and thus the associated shaft 18 and cam 20 with respect to cam 28. By changing the axial spacing between cams 20, 28, it will be seen that the amount or extent of reciprocation of the plunger and thus the extent of reciprocation of the scraper blade 50, can be selectively varied. In the embodiment illustrated, three positional stations for fastener 15a have been illustrated, but it will be understood of course that more or fewer positional stations could be provided. Varying of the stroke of reciprocation of scraper blade 50 enables a great many variations in the design produced on the work during scraping operations.

Referring now in particular to FIGURE 5, there is shown an electric drill 56 attached by means of its chuck 55 to a scraper device constructed in accordance with the instant invention, and associated with the drill there is provided a speed control mechanism 64 which may be a potentiometer of conventional type for selectively varying the speed of rotation of the motor of the electric drill, and thus varying the speed of reciprocation of the scraper mechanism. Such an arrangement enables very precise control of the scraping operation and also enables the operator to vary the scraping pattern produced by the scraping blade member.

The cam members 20 and 28 which may be formed of generally cylindrical stock material with a threaded passageway extending therethrough for removable, holding coaction with the respective threaded portion 19 and 30, may have edge portions of the cam faces 24, 26 beveled as at 68, to provide more of a surface contact rather than an edge or line contact between the cam faces during rotary movement of cam member 20. Cam members 20, 28 may be heat treated or otherwise hardened to increase the wearability of the cams.

It will be understood that the scraper mechanism may be conveniently held and operated by a workman by holding the elongated scraper mechanism in one hand while holding and operating the electric drill in the other hand. Due to the elongated, rather narrow configuration of the scraper mechanism, it can readily operate in spaces of limited access. In this connection it will be seen that the body 12 of the scraper is not much wider than the width of the scraper blade. The mechanism is readily used for every type of scraping operation and for instance may be expeditiously used to remove rust and scale from work pieces and for cleaning up filleted areas of a work piece. Many different types of scraper blades may be utilized to obtain different scraping patterns with the mechanism and to perform different types of scraping operations. For instance a toothed scraper blade of conventional type may be used to expeditiously remove scale and rust from a work piece.

From the aforegoing discussion and accompanying drawings it will be seen that the invention provides a novel scraper mechanism which is of highly simplified construction and which is adapted for attachment to a conventional portable motor unit such as an electric drill, for causing reciprocation of the scraper blade, and which embodies means for adjusting the extent of stroke of the scraper mechanism. The invention also provides an arrangement whereby the electric drill can be coupled in circuit with a means for selectively varying the speed of the drill, and thus selectively varying the speed of reciprocation of the scraper mechanism.

The terms and expressions which have been used are used as terms of description and not of limitation and there is no intention in the use of such terms and expressions of excluding any equivalents of any of the features shown or described, or portions thereof, and it is recognized that various modifications are possible within the scope of the invention claimed.

I claim:

1. In a scraper mechanism adapted for attachment to a portable motor unit such as an electric drill and comprising a housing, reciprocative means mounted in said housing and projecting from one end thereof, a scraper attached to said projecting end of said reciprocative means, laterally projecting means on said reciprocative means, and abutment means on said housing adapted for coaction with said laterally projecting means for limiting inward movement of said reciprocative means with respect to said housing, rotatable means mounted in said housing, means in said housing coacting between said rotatable means and said reciprocative means for changing rotative movement of said rotatable means to reciprocative movement of said reciprocative means, and including means for selectively changing the length of stroke of said reciprocative means.

2. A scraper mechanism in accordance with claim 1 wherein said housing is of elongated configuration and said reciprocative means includes a plunger mounted for axial movement lengthwise of said housing and means on said plunger for attaching said scraper thereto, and said rotatable means comprises a spindle mounted for rotation in said housing and having means extending outwardly therefrom adapted for attachment to the motor unit.

3. A scraper mechanism in accordance with claim 2 wherein said scraper comprises a flattened blade, said means on said plunger for attaching said scraper blade comprises a generally flattened tubular-like member secured to the outer end of said plunger, said scraper blade being detachably mounted in said tubular-like member, and means coacting with said tubular-like member to cause the latter to grip said blade.

4. A scraper mechanism in accordance with claim 2 wherein said spindle projects from the other end of said housing and is attached to an electric drill by means of the chuck on the drill, and means operatively coupled to said drill for selectively varying the speed of said drill to thus selectively vary the speed of reciprocation of said plunger.

5. A scraper mechanism in accordance with claim 1 wherein said means coacting between said rotatable means and said reciprocative means comprises cam means for changing the rotation of said rotatable means to reciprocative movement for said reciprocative means, said cam means including a cam element attached to said rotatable means and having a generally diagonally extending cam surface disposed in confronting relation to a complementary diagonally extending cam surface on a cam element attached to said reciprocative means, and spring means coacting with said reciprocative means for urging said reciprocative means inwardly with respect to said housing.

6. A scraper mechanism in accordance with claim 1 including bearing means mounted in said housing adjacent each end thereof and mounting respectively said rotatable means and said reciprocative means, said bearing means defining in conjunction with the interior of said housing a chamber in which is disposed said coacting means.

7. A scraper mechanism in accordance with claim 1 including means coacting with said reciprocative means for preventing rotation of said reciprocative means with respect to said housing during reciprocation thereof.

8. A scraper mechanism in accordance with claim 7 wherein said means for preventing rotative movement of said reciprocative means comprises wings secured to said reciprocative means and coacting with generally linearly extending slots in said housing whereby said reciprocative means can move axially with respect to said housing but is prevented from rotational movement with respect to said housing, said wings forming said laterally projecting means and said linearly extending slots having inner ends with said wings being received in said slots and with said inner ends of said slots forming said abutment means.

9. A scraper mechanism in accordance with claim 1 wherein said coacting means comprises cam members disposed in axially oriented relation in said housing and wherein said means for changing the length of stroke of said reciprocative means comprises means for selectively changing the spacing between said cam members.

References Cited

UNITED STATES PATENTS

| | | |
|---|---|---|
| 1,341,047 | 5/1920 | Dingwall. |
| 3,082,452 | 3/1963 | Heine et al. |

FOREIGN PATENTS

| | | |
|---|---|---|
| 929,976 | 7/1947 | France. |
| 1,273,330 | 8/1961 | France. |
| 1,027,039 | 3/1958 | Germany. |

CHARLES A. WILLMUTH, *Primary Examiner.*

L. G. MACHLIN, *Assistant Examiner.*